United States Patent
Subramaniam Natarajan et al.

(10) Patent No.: US 10,701,126 B2
(45) Date of Patent: Jun. 30, 2020

(54) METHOD AND A SYSTEM TO DELIVER MULTIMEDIA CONTENT IN A DOWNSTREAM NETWORK

(71) Applicant: Wipro Limited, Bangalore (IN)

(72) Inventors: Gowrishankar Subramaniam Natarajan, Chennai (IN); Jagan Mohan Gorti, Bangalore (IN); Hemant Rawat, Gurgaon (IN)

(73) Assignee: Wipro Limited, Bangalore (IN)

( * ) Notice: Subject to any disclaimer, the term of this patent is extended or adjusted under 35 U.S.C. 154(b) by 160 days.

(21) Appl. No.: 15/787,775

(22) Filed: Oct. 19, 2017

(65) Prior Publication Data

US 2019/0068679 A1    Feb. 28, 2019

(30) Foreign Application Priority Data

Aug. 31, 2017    (IN) .............................. 201741030923

(51) Int. Cl.
*H04L 29/06*    (2006.01)
*H04L 12/18*    (2006.01)
(Continued)

(52) U.S. Cl.
CPC .......... *H04L 65/80* (2013.01); *H04L 12/1868* (2013.01); *H04L 12/1886* (2013.01);
(Continued)

(58) Field of Classification Search
CPC .............. G11B 27/031; H04L 12/1868; H04L 12/1886; H04L 65/60; H04L 65/80;
(Continued)

(56) References Cited

U.S. PATENT DOCUMENTS

2005/0010635 A1*   1/2005   Schwesig ............. G11B 27/031
                                                   709/203
2008/0034393 A1*   2/2008   Crayford ............ H04N 7/17318
                                                    725/87
(Continued)

FOREIGN PATENT DOCUMENTS

EP       2670109 A1     4/2013
WO    20160180029 A1   11/2016

OTHER PUBLICATIONS

Extended European Search Report issued in the European Patent Office in counterpart European Application No. 17209187.8, dated Jun. 15, 2018, 9 pages.

*Primary Examiner* — Nicholas R Taylor
*Assistant Examiner* — Michael Li
(74) *Attorney, Agent, or Firm* — Finnegan, Henderson, Farabow, Garrett & Dunner, LLP

(57) ABSTRACT

A method and a system are described for delivering multimedia content in a downstream network. The method includes monitoring a real-time quality of service associated with a bit rate traffic from a plurality of client devices and network topographies. The method includes creating a plurality of channels, to be multi-casted by a plurality of slave servers associated with a plurality of adaptive bit rates associated with the multimedia content based on the monitoring. The method includes publishing a master manifest comprising multicast information associated with each of the plurality of channels. The method includes notifying, the plurality of slave servers to subscribe to the created plurality of channels. The method includes receiving a subscription request for the plurality of channels from the plurality of slave servers in response to the notification. The multimedia content is multi-casted to the plurality of client devices based on subscription request.

9 Claims, 7 Drawing Sheets

(51) Int. Cl.
  *H04N 21/6405* (2011.01)
  *H04N 21/61* (2011.01)
  *H04N 21/24* (2011.01)

(52) U.S. Cl.
  CPC ...... *H04L 65/4076* (2013.01); *H04L 65/4084* (2013.01); *H04L 65/4092* (2013.01); *H04L 65/604* (2013.01); *H04L 65/605* (2013.01); *H04N 21/2402* (2013.01); *H04N 21/6106* (2013.01); *H04N 21/6405* (2013.01)

(58) Field of Classification Search
  CPC . H04L 65/604; H04L 65/605; H04L 65/4076; H04L 65/4084; H04L 65/4092; H04N 7/17318; H04N 21/231; H04N 21/242; H04N 21/2402; H04N 21/2408; H04N 21/6106; H04N 21/6405; H04N 21/23439; H04N 21/00; H04N 21/47202
  See application file for complete search history.

(56) References Cited

U.S. PATENT DOCUMENTS

| | | | | |
|---|---|---|---|---|
| 2013/0067109 | A1* | 3/2013 | Dong | H04L 65/4069 709/231 |
| 2013/0179588 | A1* | 7/2013 | McCarthy | H04N 21/23418 709/231 |
| 2013/0312046 | A1* | 11/2013 | Robertson | H04N 21/00 725/93 |
| 2015/0288617 | A1* | 10/2015 | Dasher | H04L 47/801 709/226 |
| 2016/0044080 | A1 | 2/2016 | DuBreuil | |
| 2018/0077431 | A1* | 3/2018 | Wei | H04L 12/18 |
| 2018/0367591 | A1* | 12/2018 | Alm | H04L 65/605 |

\* cited by examiner

Network Statistics

Network latency: 20 fps

Bandwidth in use: 100 TB

Bandwidth required: 120 TB

Status of demand of Area: High

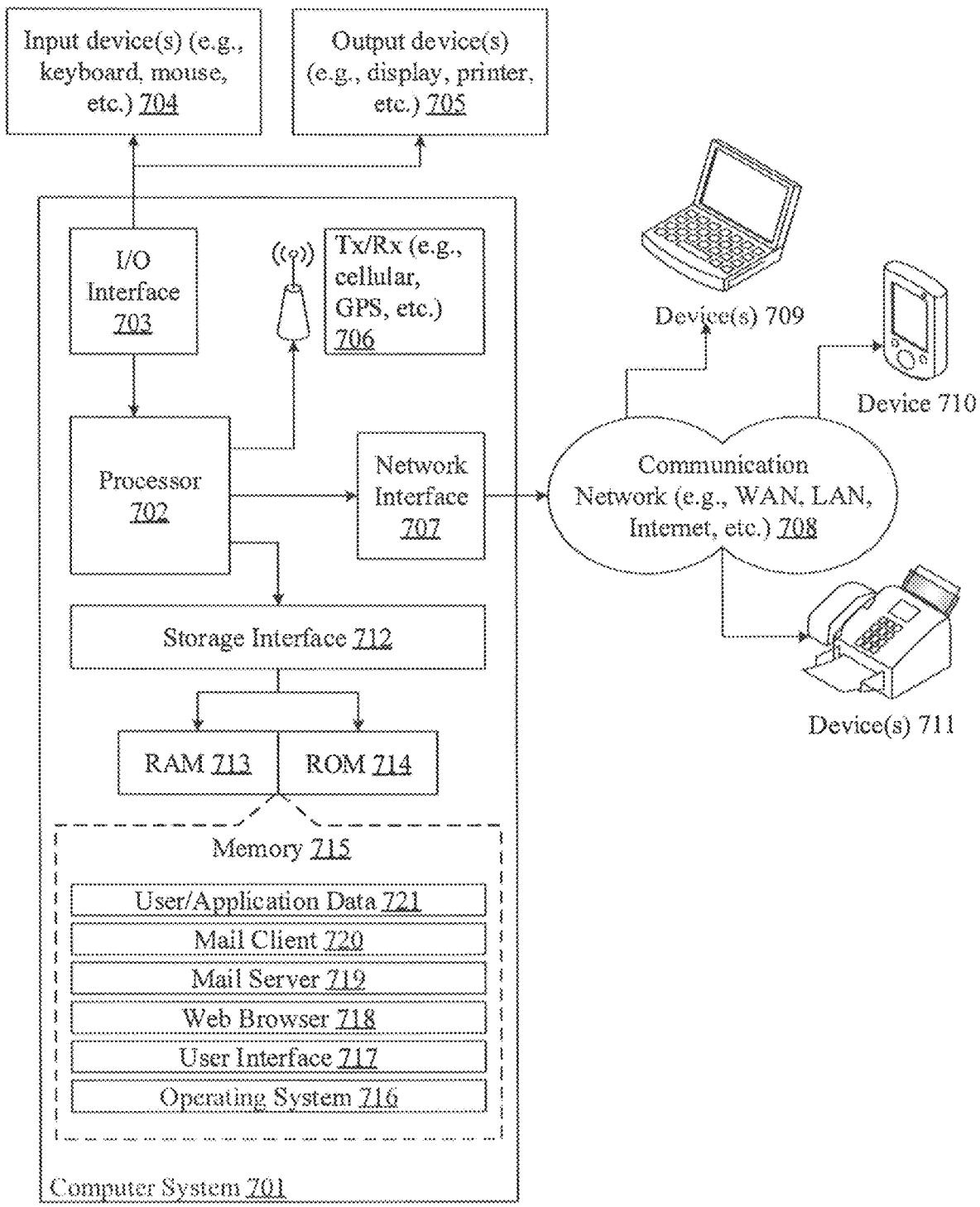
FIG. 7 Example Computer System

METHOD AND A SYSTEM TO DELIVER MULTIMEDIA CONTENT IN A DOWNSTREAM NETWORK

TECHNICAL FIELD

The present subject matter is related, in general to communication systems, and more particularly to method for delivery of multimedia content in a bandwidth constrained downstream network.

BACKGROUND

Currently, the delivery of multimedia content like video and live programs, not only happens via cable networks and DTH (direct to home), but are increasingly moving towards IP (internet protocol) based delivery of multimedia content. Consumers today may seek for a personalized & interactive video watching experience. MPVDs (Multi-programming Video Distributors) are increasingly switching to IP based video or any multimedia content delivery, to build an immersive video viewership base. Now, with the spike in number of users, there is a varied demand in a number of multimedia content and hence congestion in any downstream network bandwidth. With the launch of OTT (over the top content) services, in many situations, MPVDs do not have full control of the downstream network causing network congestion and hence inferior quality of the multimedia content may be delivered to an end user.

Also, improving the access to network bandwidth alone will not solve the problem of network congestion, since the "core" and "aggregate" networks usually have fixed bandwidth pipes. Moreover, it is much more tedious and cost prohibitive to perform regular network upgrades for bandwidth expansion. Hence, for efficient delivery of multimedia content, there is a requirement for dedicated streams for every user, resulting in random fluctuations on available network bandwidth at any given point of time. This results in unpredictable variations in quality of video streams being served to users which may end up in poor customer experience.

However, in spite of several advancements in multimedia content delivery technologies, delivering best-in class video quality over IP networks, especially for live video streaming, still presents a host of challenges. Significant amongst these challenges are network delays/jitters and packet losses due to network congestion. Across any multimedia content delivery pipeline, a multimedia content streaming losses occur in the network where the content is delivered from the CDN (content delivery network) edge caches to consumer devices viz. mobile phones, tablet form factors, Smart TVs an STBs.

Adaptive Bitrate Streaming (ABR) partially addresses the streaming challenges on networks with uncertain bandwidth. The core problem of preventing downstream network congestion due to an increased traffic in proportion to a number of users (streams increases proportionately with increase in user request) and consequently there is a reduction in available bandwidth. ABR is largely a mechanism that helps improving user perception of content quality, in networks with uncertain bandwidth by switching to lower bitrate streams smoothly but does not address the core problem of minimizing traffic congestion for live streaming. Further, unlike on demand streaming over IP, live streaming does not necessarily require dedicated unicast streams all across the delivery networks, typically 1 per user per device. This system of unicast delivery may be avoided. Currently, live streaming techniques such as ABR relies on HTTP as a streaming protocol. Though HTTP based streams can easily be delivered over CDN (Content Delivery Networks) through cache-replication, they render themselves difficult to be delivered over multicast (UDP based protocol).

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description. The method may include monitoring a real-time quality of service associated with a bit rate traffic from a plurality of client devices. In an embodiment, the quality of service associated with the bit rate traffic are associated with a plurality of network topographies. The method may include creating a plurality of channels to be multi-casted by a plurality of slave servers, associated with a plurality of adaptive bit rates associated with a multimedia content based on the monitoring. In an embodiment, the plurality of channels has an associated identifier. The method may include publishing a master manifest comprising multicast information associated with each of the plurality of channels. The method may include comparing the master manifest with the bit rate traffic from the plurality of client devices. The method may include notifying a subscription request for the plurality of channels from the plurality of slave servers in response to the notification. In an embodiment, the multimedia content subscribed by the plurality of slave servers in response to the received subscription request is multi-casted to the plurality of client devices based on the subscription associated with each of the plurality of client devices.

According to embodiments illustrated herein, there may be provided a content delivery system to receive a plurality of factors associated with a plurality of software modules of a plurality of software under test from a plurality of external systems. The processor may be configured to monitor, by a content delivery system, a real-time quality of service associated with a bit rate traffic from a plurality of client devices. In an embodiment, the quality of service associated with the bit rate traffic are associated with a plurality of network topographies. The processor may be further configured to create a plurality of channels to be multi-casted by a plurality of slave servers, associated with a plurality of adaptive bit rates associated with a multimedia content based on the monitoring. In an embodiment, the plurality of channels has an associated identifier. The processor may be further configured to publish a master manifest comprising multicast information associated with each of the plurality of channels. The processor may be further configured to compare the master manifest with the bit rate traffic from the plurality of client devices. The processor may be further configured to notify the plurality of slave servers to subscribe to the created plurality of channels based on the comparison. The processor may be further configured to receive a subscription request for the plurality of channels from the plurality of slave servers in response to the notification. In an embodiment, the multimedia content subscribed by the plurality of slave servers in response to the received subscription request is multi-casted to the plurality of client devices based on the subscription associated with each of the plurality of client devices.

According to embodiments illustrated herein, a non-transitory computer-readable storage medium having stored thereon, a set of computer-executable instructions for causing a computer comprising one or more processors to perform steps comprising, monitoring a real-time quality of service associated with a bit rate traffic from a plurality of client devices. In an embodiment, the quality of service associated with the bit rate traffic are associated with a plurality of network topographies. The one or more processors may be configured to create a plurality of channels to be multi-casted by a plurality of slave servers, associated with a plurality of adaptive bit rates associated with a multimedia content based on the monitoring. In an embodiment, the plurality of channels has an associated identifier. The one or more processors may be configured to publish a master manifest comprising multicast information associated with each of the plurality of channels. The one or more processors may be configured to compare the master manifest with the bit rate traffic from the plurality of client devices. The one or more processors may be configured to notify the plurality of slave servers to subscribe to the created plurality of channels based on the comparison. The one or more processors may be configured to receive a subscription request for the plurality of channels from the plurality of slave servers in response to the notification. In an embodiment, the multimedia content subscribed by the plurality of slave servers in response to the received subscription request is multi-casted to the plurality of client devices based on the subscription associated with each of the plurality of client devices.

BRIEF DESCRIPTION OF THE ACCOMPANYING DRAWING

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIG. 7 illustrates a flowchart of an exemplary computer system for implementing embodiments consistent with the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Figure 1:
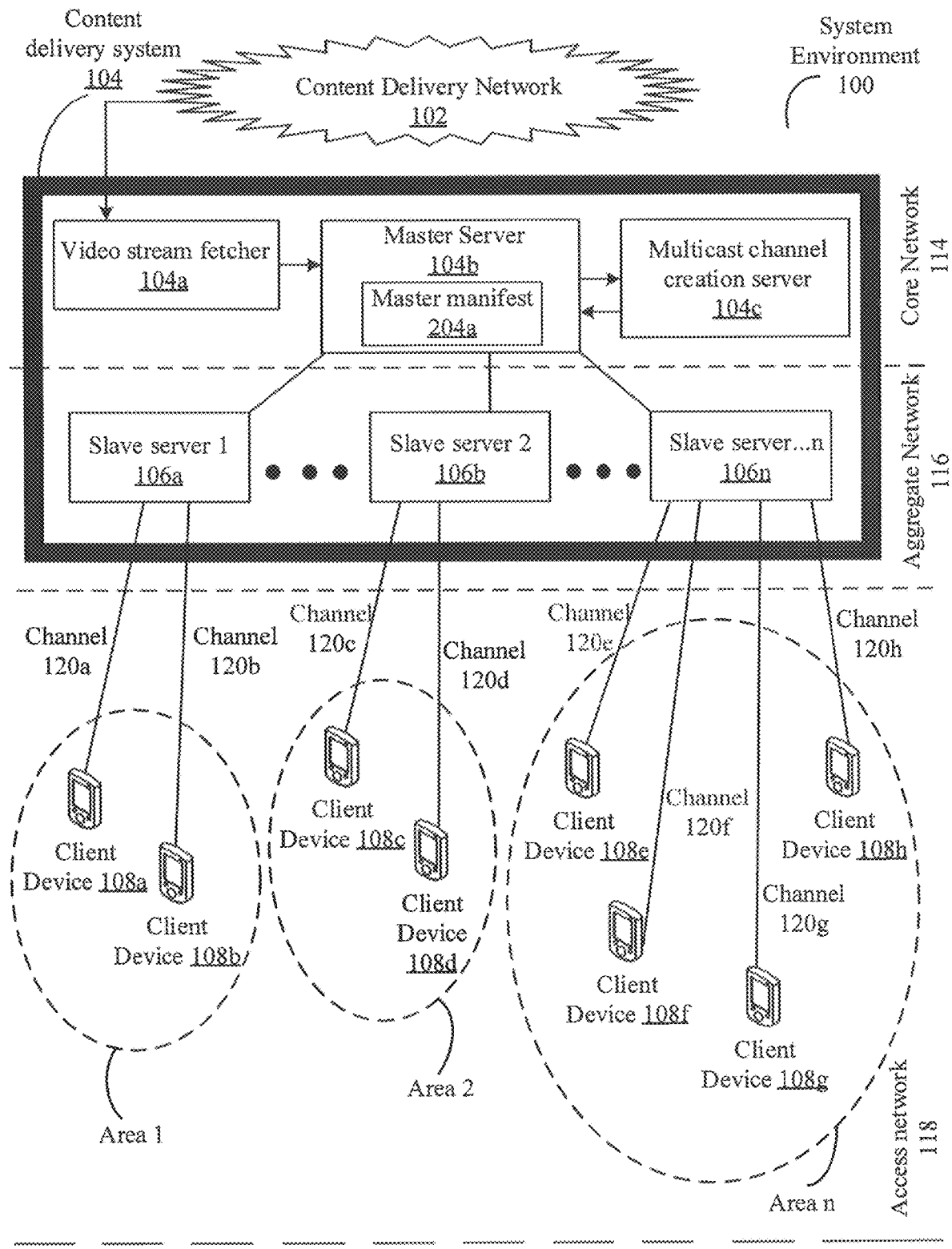
FIG. 1 is a block diagram that illustrates a system environment in which various embodiments of the method and the system may be implemented.

FIG. 1 is a block diagram that illustrates a system environment 100 in which various embodiments of the method and the system may be implemented. The system environment 100 may include a content delivery network 102, a content delivery system 104 that further includes a video stream fetcher 104a, a master server 104b, a multicast channel creation server 104c, a plurality of slave servers 106a, 106b . . . 106n (collectively referenced as 106). The system environment 100 may further include a plurality of client devices 108a, 108b, 108c, 108d, 108e, 108f, 108g and 108h (collectively referenced as 108) in a plurality of areas, Area1, Area2, . . . Area n respectively. The plurality of areas corresponds to geographical area. The entire network topography may be divided into core network 114, aggregate network 116 and access network 118. In an embodiment, the content delivery network 102, the video stream fetcher 104a, master server 104b and the multicast channel creation server 104c may belong to the core network 114. The plurality of slave servers 106 may belong to the aggregate network 116 and the plurality of client devices 108 may belong to the access network 118 of the network topography. The plurality of client devices 108 receiving the multimedia content, may belong to the access network 118 and may include the downstream network.

The content delivery network 102 (CDN) may be a distribution network in a geographically distributed network of proxy servers and their data centers. In an embodiment, the content delivery network 102 may be configured to deliver multimedia content in a bandwidth constrained downstream network in accordance with the embodiment of the present disclosure. Further, an exemplary system may incorporate at least a processor, memory which may include a temporary transient (volatile) memory such as Random-Access Memory and a computer readable medium or article.

The memory may store a set of instruction or algorithm, which may be executed by at least one processor in accordance with present disclosure. In an embodiment, the content delivery system 104 may be adapted to leverage video streaming technologies in conjunction with advancement in network management technologies. In an embodiment, live HTTP based ABR streams (adaptive bit rate streams) may be delivered by the media encoder-packager systems over to the content delivery network 102. Further, the plurality of slave servers 106 may be adapted to transmit video streams to the plurality of client devices 108 via a communication network.

In an embodiment, the content delivery network 102 may distribute service spatially, relative to end-users to provide high availability and high performance. The content delivery network 102 may serve a huge volume of content over the internet, like web objects (text, graphics and scripts), downloadable objects (media files, software, documents), applications (e-commerce, portals), live streaming media, on-demand streaming media, and social networks. The content delivery network 102 may be a layer in the internet ecosystem. Content owners such as media companies and e-commerce vendors may pay content delivery operators to deliver their content to their end-users. In turn, the content delivery network 102 may pay ISPs (internet service protocol), carriers, and network operators for hosting its servers in data centers.

In an embodiment, the content delivery network 102 may be connected to the content delivery system 104. The video stream fetcher 104a may be an intelligence unit configured to gather data on network statistics, which may involve Quality of Service (hereafter QoS). The video stream fetcher 104a may be a part of the core network 114, which may identify adaptive bitrates from the content delivery network 102 and cache them into individual profiles.

The master server 104b may reside in the core network 114. In an embodiment, the master server 104b may be adapted to stream a plurality of channels 120a, 120b, . . . 120h (collectively referenced as 120) to the corresponding adaptive bit rates. The master server 104b may be based on a software-defined networking (SDN) controller for monitoring the core network 114, aggregate network 116 and access network 118 constantly to profile the multimedia content traffic demand based on a bit rate traffic from a plurality of users. In an embodiment, the SDN controller may be an application in software-defined networking (SDN) that manages flow control to enable intelligent networking. The SDN controller may be based on protocols, such as OpenFlow, that allow servers to signal switches where to send packets. In an embodiment, the master server 104b may fuse an information on a plurality of bitrates with a real-time traffic insights coming in from the SDN enabled switches and routers in the core, aggregate and access network 118 through pre-defined rules. The master server 104b may determine which aggregate and access nodes to notify for subscription to the multicast channel services specific to the video being requested. In an embodiment, the master server 104b may be configured to publish a master manifest 204a. The master manifest 204a may be file or a TCP/IP packet including a multicast information associated with the plurality of channels 120.

The multicast channel creation server 104c is configured to communicate to the master server 104b. In an embodiment, the multicast channel creation server 104c may create the plurality of channels 120 associated with a plurality of adaptive bit rates associated with the multimedia content. In an embodiment, the plurality of slave servers 106 may receive content through the plurality of channels 120. In an embodiment, the multicast channel creation server 104c may create the plurality of channels 120 in the core network 114 and may maintain a data of active and inactive servers and information on what bit rates corresponding to the multimedia content are being streamed. The multicast channel creation server 104c may be configured to communicate with the master server 104b to update the master manifest 204a with the associated server identifiers corresponding to the plurality of channels 120 associated with the adaptive bit rates.

In an embodiment, the master server 104b is connected to a plurality of slave servers 106. The plurality of slave servers 106 may be configured to transfer the multimedia content through the plurality of channels 120 to the plurality of client devices 108. In an embodiment, the plurality of slave servers 106 may reside in the aggregate network 116 and may subscribe to the plurality of channels 120 from the master server 104b. In an embodiment, the plurality of slave servers 106 may connect to the client devices 108.

Figure 2:
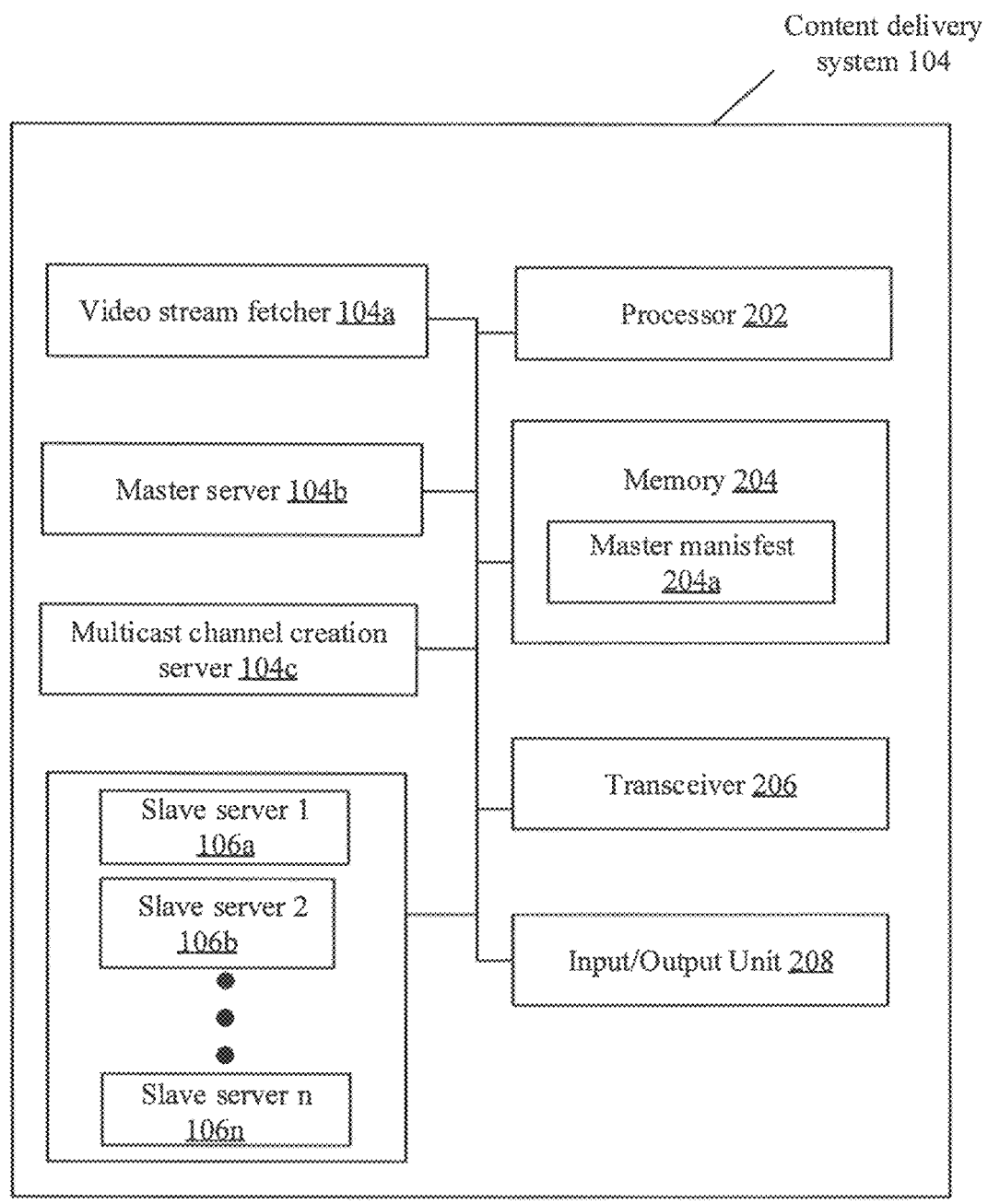
FIG. 2 is a block diagram that illustrates a content delivery system configured to deliver multimedia content in a downstream network, that is being streamed by a plurality of users over a plurality of channels, in accordance with some embodiments of the present disclosure.

FIG. 2 is a block diagram that illustrates the content delivery system 104 configured to deliver the multimedia content in a downstream network, in accordance with some embodiments of the present disclosure. The content delivery system 104 may include a processor 202, a memory 204, a transceiver 206, and an input/output unit 208. The content delivery network 102 may further include the video stream fetcher 104a, the master server 104b, the master manifest 204a (stored in the memory 204) the multicast channel creation server 104c and the plurality of slave servers 106. The processor 202 may be communicatively coupled to the memory 204, the transceiver 206, the input/output unit 208, the video stream fetcher 104a, the master server 104b, the multicast channel creation server 104c and the plurality of slave servers 106.

The processor 202 may include suitable logic, circuitry, interfaces, and/or code that may be configured to execute a set of instructions stored in the memory 204. The processor 202 may be implemented based on a number of processor technologies known in the art. Examples of the processor 202 include, but not limited to, an X86-based processor, a Reduced Instruction Set Computing (RISC) processor, an Application-Specific Integrated Circuit (ASIC) processor, a Complex Instruction Set Computing (CISC) processor, and/or other processor.

The memory 204 may include suitable logic, circuitry, interfaces, and/or code that may be configured to store the set of instructions, which may be executed by the processor 202. In the current disclosure, the memory 204 may be configured to store the master manifest 204a. In an embodiment, the memory 204 may be configured to store one or more programs, routines, or scripts that may be executed in coordination with the processor 202. The memory 204 may be implemented based on a Random-Access Memory (RAM), a Read-Only Memory (ROM), a Hard Disk Drive (HDD), a storage server, and/or a Secure Digital (SD) card.

The transceiver 206 may include suitable logic, circuitry, interfaces, and/or code that may be configured to transmit a request to the video stream fetcher 104a to identify the multimedia content being streamed by a plurality of client devices 108. In an embodiment, the master server 104b may store information about the plurality of channels 120, to be multi-casted by the plurality of slave servers 106, associated with the plurality of adaptive bit rates associated with the multimedia content. In an embodiment, the plurality of channels 120 has an associated identifier. The transceiver 206 may implement one or more known technologies to support wired or wireless communication with the communication network. In an embodiment, the transceiver 206 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 206 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi®) (e.g., IEEE 802.11a, IEEE 802.11b, IEEE 802.11g and/or IEEE 802.11n), voice over Internet Protocol (VoIP), Wi-MAX®, a protocol for email, instant messaging, and/or Short Message Service (SMS)

The Input/Output (I/O) unit 208 may include suitable logic, circuitry, interfaces, and/or code that may be configured to receive an input or transmit an output. The input/output unit 208 may include various input and output devices that are configured to communicate with the processor 202. Examples of the input devices include, but are not limited to, a keyboard, a mouse, a joystick, a touch screen, a microphone, and/or a docking station. Examples of the output devices include, but are not limited to, a display screen and/or a speaker.

The video stream fetcher 104a may monitor a real-time quality of service associated with the bit rate traffic from a plurality of client devices 108. In an embodiment, the quality of service associated with the bit rate traffic are associated with a plurality of network topographies. In an embodiment, the real time quality of service associated with the plurality of network topographies are based on (but not limited to) network latencies, packets per second, active versus inactive multicast routing nodes, failed nodes, video throughput, video frame losses, load on the plurality of slave servers, number of active versus available slave servers, popular titles and channels being watched, number of concurrent and active subscribed client devices 108 on the plurality of channels 120 being multi-casted by the plurality of slave servers 106. In an embodiment, the network topographies may be a layout of interconnections between computers in a computer network. In an embodiment, the computers in a network topography may be a node, router, network switch or routers. In an embodiment, the network topography may be of different types; including point to point, bus, star, ring, mesh, tree and hybrid. In an embodiment, the real-time quality of service may further be associated with re-buffering ratio, average bit rate, concurrent streams played, and buffer rates of the multimedia content multi-casted to the plurality of client devices 108. The video stream fetcher 104a may be an intelligence unit configured to gather data on network statistics, which also involves quality of service. The video stream fetcher 104a may identify adaptive bitrates from the content delivery network 102 and cache them into individual profiles.

The master server 104b may be in the core network 114 and is configured to create the plurality of channels 120, to be multi-casted by the plurality of slave servers 106, associated with the plurality of adaptive bit rates associated with the multimedia content based on the monitoring. In an embodiment, the plurality of channels 120 may have the associated identifier. In an embodiment, the master server 104b may publish the master manifest 204a comprising multicast information associated with each of the plurality of channels 120. In an embodiment, the master server 104b may compare the master manifest 204a with the bit rate traffic from the plurality of client devices 108. In an embodiment, the master server 104b may notify the plurality of slave servers 106 to subscribe to the created plurality of channels 120 based on the comparison. In an embodiment, the master server 104b may further update the plurality of adaptive bit rates into one or more updated adaptive bit rates. In an embodiment, the plurality of channels 120 associated with the updated adaptive bit rates may be associated with new server identifiers, in case of degradation of the quality of service associated with the multimedia content. In an exemplary embodiment, the master server 104b may be based on a SDN Controller for monitoring the entire core network 114, aggregate network 116 and access network 118 constantly to profile the multimedia content traffic demand based on a bit rate traffic from a plurality of users. In the exemplary embodiment, the SDN controller may be an application in software-defined networking (SDN) that manages flow control to enable intelligent networking. The SDN controller may be based on protocols, such as OpenFlow, that allow servers to signal switches where to send packets. In an embodiment, the master server 104b may further delete the plurality of channels 120 based on a notification from one or more slave servers. In an embodiment, the plurality of slave servers 106 may transmit the notification to the content delivery system 104. In an embodiment, the deletion of the plurality of channels 120 may be associated with a subscription request for the multimedia content from the plurality of client devices 108 may decrease quantitatively to a pre-determined value. For example, if current demand from the plurality of client devices 108 may decrease quantitatively below a threshold value the demand status is updated. In the example, if in Area1 there are 10 subscribers demanding a multimedia content, a multicast channel may be created. However, if the video stream fetcher 104a finds at a point of time that demand from the client devices 108 have fallen to 2 subscribers, the multicast channel may be deleted. Here in the example, the lower threshold value for deletion of the multicast channel is 2.

The multicast channel creation server 104c may create a plurality of channels 120, to be multi-casted by a plurality of slave servers 106. In an embodiment, the multicast information may traverse through the plurality of channels 120 associated with the identifiers, to the plurality of slave servers 106. The multicast channel creation server 104c is configured to communicate to the master server 104b. In an embodiment, the multicast channel creation server 104c may create a plurality of channels 120 associated with a plurality of adaptive bit rates associated with the multimedia content. In an embodiment, the multicast channel creation server 104c may create the plurality of channels 120 in the core network 114 and may maintain a data of active and inactive servers and information on what bit rates corresponding to the multimedia content are being streamed. The multicast channel creation server 104c may be configured to communicate with the master server 104b to update the master manifest 204a with the server identifiers corresponding to the multicast the plurality of channels 120 associated with the adaptive bit rates.

The plurality of slave servers 106 may be in the aggregate network 116 or in access network 118 in certain embodiments. In an embodiment, the plurality of slave servers 106 may be configured to multicast the plurality of channels 120 created by the multicast channel creation server 104c. In embodiment, the plurality of slave servers 106 may be configured to subscribe, on notification from the master server 104b, to the plurality of channels 120 created. In an embodiment, the plurality of slave servers 106 may be further configured to subscribe from the master server 104b, the multimedia content in response to a subscription request received from a plurality of client devices 108.

In operation, video stream fetcher 104a may monitor a real-time quality of service associated with the bit rate traffic from a plurality of client devices 108. In an embodiment, the quality of service associated with the bit rate traffic are associated with a plurality of network topographies. In an embodiment, the real time quality of service associated with the plurality of network topographies are based on (but not limited to) network latencies, packets per second, active versus inactive multicast routing nodes, failed nodes, video throughput, video frame losses, load on the plurality of slave servers, number of active versus available slave servers, popular titles and channels being watched, number of concurrent and active subscribed plurality of client devices 108 on the plurality of channels 120 being multi-casted by the plurality of slave servers 106. In an embodiment, the network topographies may be a layout of interconnections between computers in a computer network. In an embodiment, the computers in a network topography may be a node, router, network switch or routers. In an embodiment, the network topography may be of different types; including point to point, bus, star, ring, mesh, tree and hybrid. In an embodiment, the real-time quality of service may further be associated with re-buffering ratio, average bit rate, concurrent streams played, and buffer rates of the multimedia content multi-casted to the plurality of client devices 108. The video stream fetcher 104a may be an intelligence unit configured to gather data on network statistics, which also involves quality of service (hereafter QoS). The video stream fetcher 104a which may identify adaptive titrates from the content delivery network 102 and cache them into individual profiles.

For example, the following table, Table 1 may explain the embodiment.

TABLE 1

| Area | No. of users demanding a content | Bandwidth available mbps (megabits/ second) | Bandwidth required | Content category | Quality of service status flag/ Congestion |
|---|---|---|---|---|---|
| Area 1 | 1000 | 10 | 30 | HD Sports (High definition) | High congestion |
| Area 2 | 500 | 5 | 10 | SD Movies | Medium congestion |
| Area 3 | 10 | 1 | 1 | News | Low congestion |

In an embodiment, the areas may be Area 1, Area 2 . . . Area n spread geographically apart, but within a predefined area to which a service provider may provide service from its content delivery network 102. The data showed in the Table 1 may, in this situation, represent the process by which may mine the network topography to monitor the multimedia content on demand, the corresponding network statistics associated with the multimedia content on-demand from the client devices 108. In the embodiment, Area 1 of a pre-defined geographical area is of interest. In the instant case the master server 104b directs the multicast channel creation server 104c to create a multicast channel (plurality of channels 120). The master server 104b may then instruct the plurality of slave servers 106 to subscribe to the multicast channel created. The video stream fetcher 104a figures out the bit rate traffic of a particular multimedia content incoming from the plurality of client devices 108 and identifies what adaptive bit rates may correspond to the bit rate traffic incoming from the plurality of client devices 108. The video stream fetcher 104a may monitor the real-time quality of service associated with the bit rate traffic from a plurality of client devices 108. The video stream fetcher 104a may further determine QoS parameters associated with the plurality of network topographies. The parameters determining the congestion may include, network latencies, packets per second, active versus inactive multicast routing nodes, failed nodes, video throughput, video frame losses, load on the plurality of slave servers, number of active versus available slave servers, popular titles and channels being watched, number of concurrent and active subscribed client devices 108 on the plurality of channels 120 being multi-casted by the plurality of slave servers 106.

In an embodiment, the video stream fetcher 104a may extract the adaptive bit rates from the content delivery network 102 and cache them into individual profiles. In an embodiment, each individual adaptive bit rate profile may be of different bandwidth unit. The extraction of adaptive bit rates may be based on the congestion status as showed in Table 1 and may take the values of "High congestion", or "medium congestion" or "low congestion".

After monitoring real time quality of service associated with bit rate traffic, the video stream fetcher 104a may indicate the master server 104b to initiate creation of the plurality of channels 120 for the individual adaptive bit rate profiles. The multicast channel creation server 104c may be in the core network 114 and is configured to create the plurality of channels 120, to be multi-casted by the plurality of slave servers, associated with the plurality of adaptive bit rates associated with a multimedia content based on the monitoring. In an embodiment, the plurality of channels 120 may have the associated identifier. For example, the associated identifiers may have an address of 100.25.26.27, 100.25.26.28, 100.25.26.29 . . . In the embodiment, a slave server (106 for example) multicasting to Area 1 connects to the master server 104b through the multicast channel having the address as 100.25.26.27. In an embodiment, the master server 104b may publish the master manifest 204a comprising multicast information associated with each of the plurality of channels 120. For example, the master manifest 204a may be a file or certain tag value pairs. The master manifest 204a may look like as shown;

Version=2.0
NameList High Bandwidth Content, First to be deployed
Title=HD Sports Table 2 is an exemplary embodiment showcasing a master manifest file.

TABLE 2

| Tag | Value |
|---|---|
| Version (mandatory) | The current version is 1.0. (This is the version of the manifest scripting language used to write the manifest.) |
| NameList (optional) | High bandwidth content requirement, first to be deployed |

TABLE 2-continued

| Tag | Value |
| --- | --- |
| Title (optional) | HD Sports |

In Table 2 Version Tag may be a version of the manifest scripting language used to write the manifest. The name list tag may consist a comma separated list of applications. In this list, the name of any application must be the same as the file name for that application in the Deployment Server file system. The applications may be installed in the order listed. Any applications in the file system that are not included in the list may be installed after the listed applications, in an undetermined order. If no Name List is available, all applications in the file system may be installed in an undetermined order.

In an embodiment, the master server 104b may compare the master manifest 204a with the bit rate traffic from the plurality of client devices 108. In an embodiment, the master server 104b may notify the plurality of slave servers 106 to subscribe to the created plurality of channels 120 based on the comparison. In an embodiment, the master server 104b may further update the plurality of adaptive bit rates into one or more updated adaptive bit rates. In an embodiment, the plurality of channels 120 associated with the updated adaptive bit rates may be associated with new server identifiers, in case of degradation of the quality of service associated with the multimedia content.

In an embodiment, the master server 104b may instruct the multicast channel creation server 104c to create the plurality of channels 120, to be multi-casted by a plurality of slave servers 106. The plurality of channels 120 created by the multicast channel creation server 104c, may be associated with the plurality of adaptive bit rates, associated with the multimedia content. The multicast channel creation server 104c may be of different service providers, which may be a server in the content delivery system 104. The multicast channel creation server 104c may be "WIDEVINE MODULAR DRM™" or "CHANGELOG™" or "tcp Dump™". In an embodiment, the plurality of channels 120 may be associated with their corresponding identifier. For example, the multicast channel creation server 104c may be configured to perform the following steps; for creating plurality of channels 120:

Step 1: go to Channels, select a channel, open Output tab
Step 2: select Stream type: DASH
Step 3: select DRM: Widevine
Step 4: enter Key Server URL, Signer, AES signing key.
Step 5: enter Content ID; unique channel identified (only digits 0-9 allowed)

After the plurality of channels 120 are created for multi-casting, the master server 104b may publish the master manifest 204a comprising multicast information associated with each of the plurality of channels 120. The master manifest 204a may be a data stored in the memory 204 of the content delivery system 104. In an embodiment, the master server 104b may request the master manifest 204a from the memory 204 when the master manifest 204a may be published over the plurality of channels 120. In an embodiment, the master server 104b may further compare the master manifest 204a with the bit rate traffic from the plurality of client devices 108. In an embodiment, information on the bit rate traffic incoming from the plurality of client devices 108 may be sent to the master server 104b upon a request, to be compared with the master manifest 204a sent from the memory 204. In an embodiment, comparing may include comparing at a point of time, a demand for the multimedia content at a current point of time and the demand at a previous point of time. For example, the comparison may include determining the demand at T interval and the demand at T-1 interval. In an embodiment, the demand may be a pre-configured number of users streaming to the multimedia content. In an embodiment, based on the comparison, the master server 104b may notify the plurality of slave servers 106 to subscribe to the created plurality of channels 120, to deliver the multimedia content of the adaptive bit rate similar to the bit rate traffic from the plurality of client devices 108.

On receiving the notification from the master server 104b, the plurality of slave servers 106 may receive the subscription request for the plurality of channels 120. In an embodiment, the multimedia content subscribed by the plurality of slave servers 106 may be multi-casted to the plurality of client devices 108 based on the subscription associated with each of the plurality of client devices 108. In an embodiment, the multicast information may traverse through the plurality of channels 120 associated with the identifiers, to the plurality of slave servers. In an embodiment, may further include deletion of the plurality of channels 120 by the master server 104b, based on a notification from one or more slave servers. In an embodiment, the one or more slave servers may notify the master server 104b in an event of fall in subscription of the multimedia content below a predetermined value.

The following example may show how the plurality of slave servers 106 may subscribe to the master server 104b to receive the multimedia content. In an example, between a master server and a slave server, a multicast transmission of Precision Time Protocol (PTP) packets may be configured between a master server 104b and the plurality of slave servers 106. The multicast method of transport of PTP packets is applicable in environments in which PTP uses IEEE 802.3 or Ethernet encapsulation for the transmission of PTP packets. Because PTP over Ethernet uses multicast addresses, a slave server can automatically start receiving the multicast announce messages (multimedia content in this disclosure) transmitted by the master ports on a network and can also start communicating with the master port with minimal or no configuration. Unlike PTP over IPv4 where IP addresses are used to identify the master and slave ports, with PTP over Ethernet, multicast MAC addresses are used in forwarding of PTP traffic.

The plurality of client devices 108a, 108b . . . 108h may form a part of the access network 118. For example, Table 3 shows a list of client devices accessing the multimedia content.

TABLE 3

| Device Type | Number of Users | Quality of streaming |
| --- | --- | --- |
| Smart Phone | 1000 | HD |
| Smart TV | 10 | HD |
| Tablet | 500 | HD |

In an embodiment, the plurality of client devices 108 may be built on different platforms. For example, the plurality of client devices 108 may be a smart phone, a tablet, a smart television, LED television.

Figure 3:
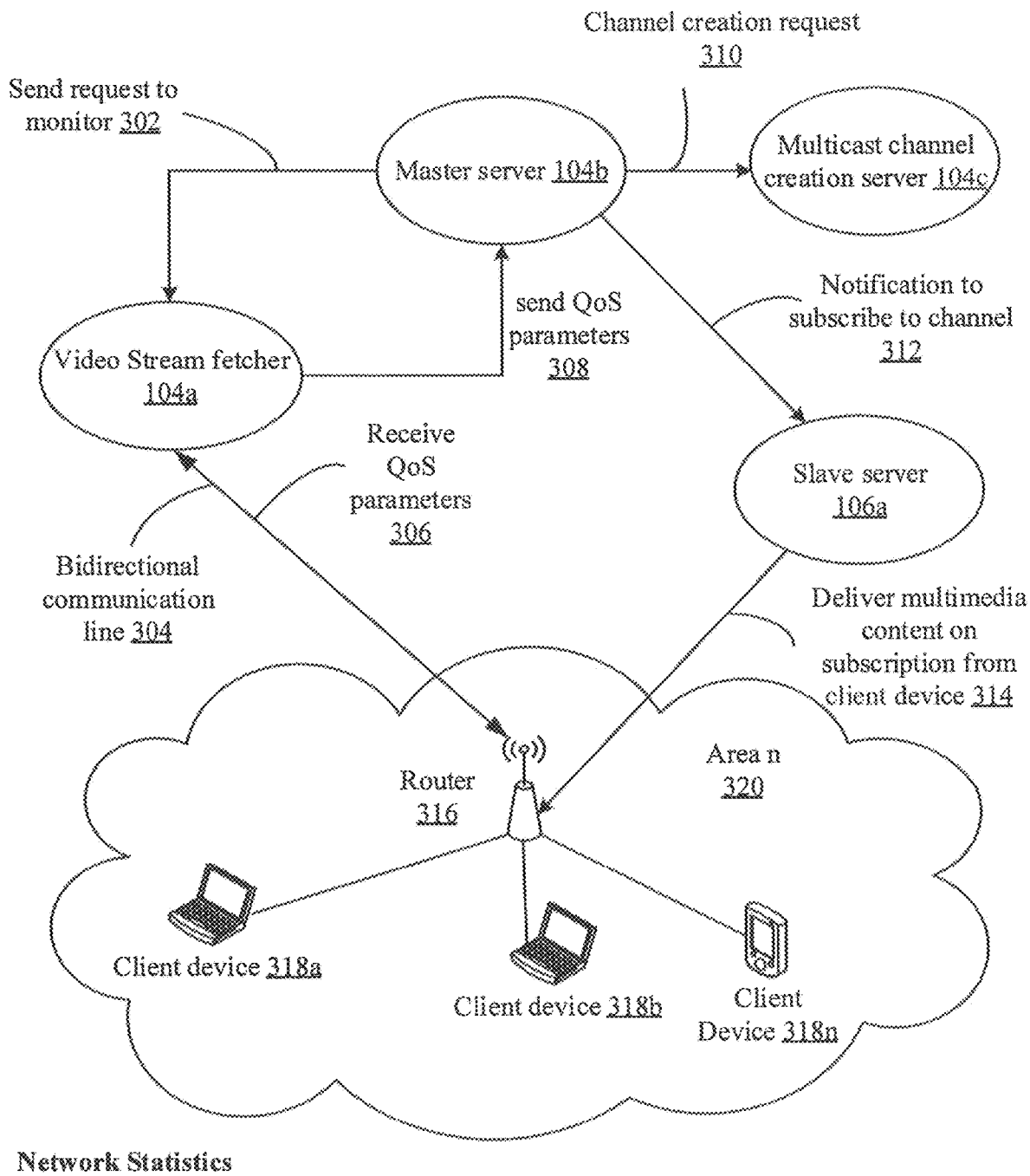
FIG. 3 is a flowchart illustrating a method for transmitting, the multimedia content over the plurality of channels based on a request from the plurality of client devices.

FIG. 3 is a flowchart illustrating a method for transmitting the multimedia content over the plurality of channels 120 based on a request from the plurality of client devices 108.

The following steps form a part of an embodiment and may also be performed by alterations in chronological order of the steps without modifying the scope of the disclosure. In an embodiment, Step 302 may include sending a request by the master server 104b to monitor, by the video stream fetcher 104a, the plurality of network topographies in the access network 118. This may include identifying the multimedia content on-demand by the plurality of client devices 108. The monitoring may involve determining the quality of service associated with the bit rate traffic of the corresponding multimedia content.

The first step (through a bidirectional communication line 304) may involve monitoring by the video stream fetcher 104a, the plurality of network topographies (to which the plurality of client devices 108 are connected). The video stream fetcher 104a is the intelligence unit configured to gather data on network statistics, which involves QoS. The video stream fetcher 104a may communicate with a router 316 in an Area a in a particular geographical area. The router 316 may apprise the video stream fetcher 104a through the bidirectional communication line 304, about the multimedia content on demand and the QoS associated with the plurality of network topographies of which the router in Area n is a part of it.

The second step (receive QoS parameters) may involve creating the plurality of channels 120, upon receiving the QoS 306 and bit rate traffic corresponding to the multimedia content, associated with the plurality of network topographies. The master server 104b instructs the multicast channel creation server 104c to create the plurality of channels 120, to be multi-casted by a plurality of slave servers 106 where the plurality of channels 120 is associated with the identifier.

The third step (send QoS parameters 308) may involve sending the QoS parameters to the master server 104b before the master manifest 204a may be published.

The fourth step (channel creation request 310) may involve a request to the multicast channel creation server 104c for creating a channel.

The fifth step (notification to subscribe to channel) may involve publishing by the master server 104b the master manifest 204a, once the plurality of channels 120 is created by the multicast channel creation server 104c and upon the notification sent to the plurality of slave servers 106 to subscribe to the channel. The master server 104b publishes the master manifest 204a comprising multicast information associated with each of the plurality of channels 120. The master manifest 204a may be a data stored in the memory 204 of the content delivery system 104. The master server 104b may request the memory 204 when the master manifest 204a may be published over the plurality of channels 120. In an embodiment, the master server 104b may further compare the master manifest 204a with the bit rate traffic from the plurality of client devices 108. In an embodiment, an information on the bit rate traffic incoming from the plurality of client devices 108 may be sent to the master server 104b upon a request, to be compared with the master manifest 204a sent from the memory 204.

The master server 104b compares the master manifest 204a with the bit rate traffic from the plurality of client devices. The comparison may include, monitoring the access network 118 for bit rate traffic being streamed in actively in demand. In an embodiment, the demand may be a preconfigured number of users streaming to the multimedia content. In an embodiment, based on the comparison, the master server 104b may notify the plurality of slave servers 106 to subscribe to the created plurality of channels 120, to deliver the on-demand content of the adaptive bit rate similar to the bit rate traffic from the plurality of client devices 108. In an embodiment, the plurality of slave servers 106 may receive a subscription request for the plurality of channels 120 from the plurality of slave servers 106 in response to the notification. The multimedia content subscribed by the plurality of slave servers 106 in response to the received subscription request is multi-casted to the plurality of client devices 108 based on the subscription associated with each of the plurality of client devices 108.

The sixth step (deliver multimedia content on-demand to client device upon subscription 314) may involve delivery of multimedia content on subscription from client device 108 in Area 320. In an embodiment, router 316 may reside in the access network 118 or in the aggregate network 116 from where the multicasting may initiate.

Table 3 may denote the network statistics as monitored by the content delivery system 104. In an embodiment, the network statistics may be monitored on router 316 at a point of time.

TABLE 4

| Time (AM/PM) | Bandwidth in use | Bandwidth required | Status of demand |
|---|---|---|---|
| 6 PM | 2 mbps | 2 mbps | Low |
| 6:30 PM | 10 mbps | 12 mbps | Medium |
| 8 PM | 10 mbps | 30 mbps | High |

Table 4 is only an embodiment and shows the demand for the multimedia content at instants of time. In situations of low demand and high demand a multicasting may not be required. However, at 8 PM when the demand is high, the content delivery system 104 may multicast to the plurality of client devices 108a, 108b . . . 108h.

Figure 4:
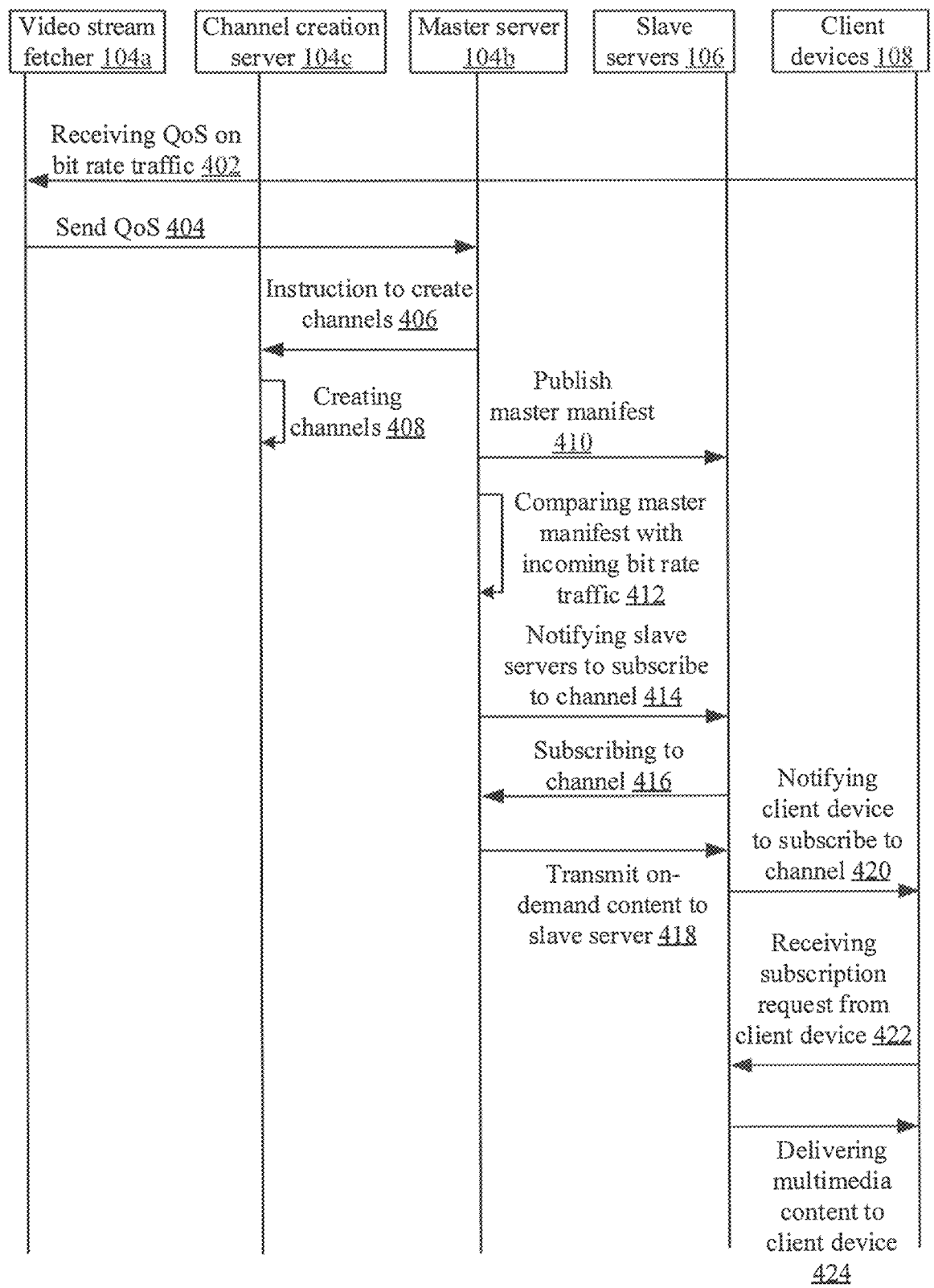
FIG. 4 illustrates an interaction diagram of various components interacting with each other for implementing embodiments consistent with the present disclosure.

FIG. 4 is an interaction diagram. The interaction diagram is an embodiment showcasing the components, as mentioned in the disclosure. The interaction diagram may show the interconnections of the components across the core network 114, aggregate network 116 and the access network 118. FIG. 4 is an embodiment showcasing a functional interconnection of the components spread across the network in entirety. The method explains the interaction of the video stream fetcher 104a, multicast channel creation server 104c master server 104b, the plurality of slave servers 106 and the plurality of client devices 108.

At 402 (as in FIG. 4), the video stream fetcher 104a may be configured to receive the QoS parameters from the plurality of client devices 108. The video stream fetcher 104a may monitor the QoS associated with bit rate traffic from a plurality of client devices 108, spread across the network topography. In the exemplary embodiment, a QoS parameters may reach the video stream fetcher 104a. The QoS may further include determining network latencies, packets per second, active versus inactive multicast routing nodes, failed nodes, video throughput, video frame losses, load on the plurality of slave servers 106, number of active versus available slave servers, popular titles and channels being watched, number of concurrent and active subscribed client devices 108 on the plurality of channels 120 being multi-casted by the plurality of slave servers 106. At step 404 the received QOS parameters may be provided to the master server 104b.

At 406, the master server 104b may instruct the multicast channel creation server 104c to create the plurality of channels 120. The master server 104b may interact with the multicast channel creation server 104c to create the plurality of channels 120, to be multi-casted by the plurality of slave servers 106, associated with the plurality of adaptive bit rates associated with the multimedia content based on the monitoring. In an embodiment, the plurality of channels 120 may have an associated identifier. At 408, in response to the received instruction, the multicast channel creation server 104c may create the plurality of channels 120. The information pertaining to the plurality of channels 120 is provided to the master server 104b. At step 410, the master server 104b may be configured to create the master manifest 204a and publish the master manifest 204a to the plurality of slave servers 106. In the embodiment, upon creating the plurality of channels 120 the master server 104b may interact with the plurality of slave servers 106 to publish the master manifest 204a including the multicast information associated with each of the plurality of channels 120. In the course of interaction with the plurality of slave servers 106, at step 412 the master server 104b may compare the master manifest 204a with the bit rate traffic from the plurality of client devices 108.

At step 414, the master server 104b notifies the plurality of slave servers 106 to subscribe to multicast channel (one of the plurality of channels 120). In an embodiment, the master server 104b may farther notify the plurality of slave servers 106 to subscribe to the created plurality of channels 120 based on the comparison. At step 416, the plurality of slave servers 106 subscribes to the plurality of channels 120. Step 418, involves transmitting the multimedia content to the plurality of slave servers 106. At step 420, the plurality of slave servers 106 may notify the plurality of each devices to subscribe to the plurality of channels 120. At step 422 the plurality of slave servers 106 receives subscription from the plurality of client devices 108. Step 424 involves delivering the multimedia content to the plurality of client devices 108.

In an embodiment, the plurality of slave servers 106 may interact with the master server 104b to receive the subscription request for the plurality of channels 120 in response to the notification. In an embodiment, the multimedia content subscribed by the plurality of slave servers 106 in response to the received subscription request is multi-casted to the plurality of client devices 108 based on the subscription associated with each of the plurality of client devices 108.

Figure 5:
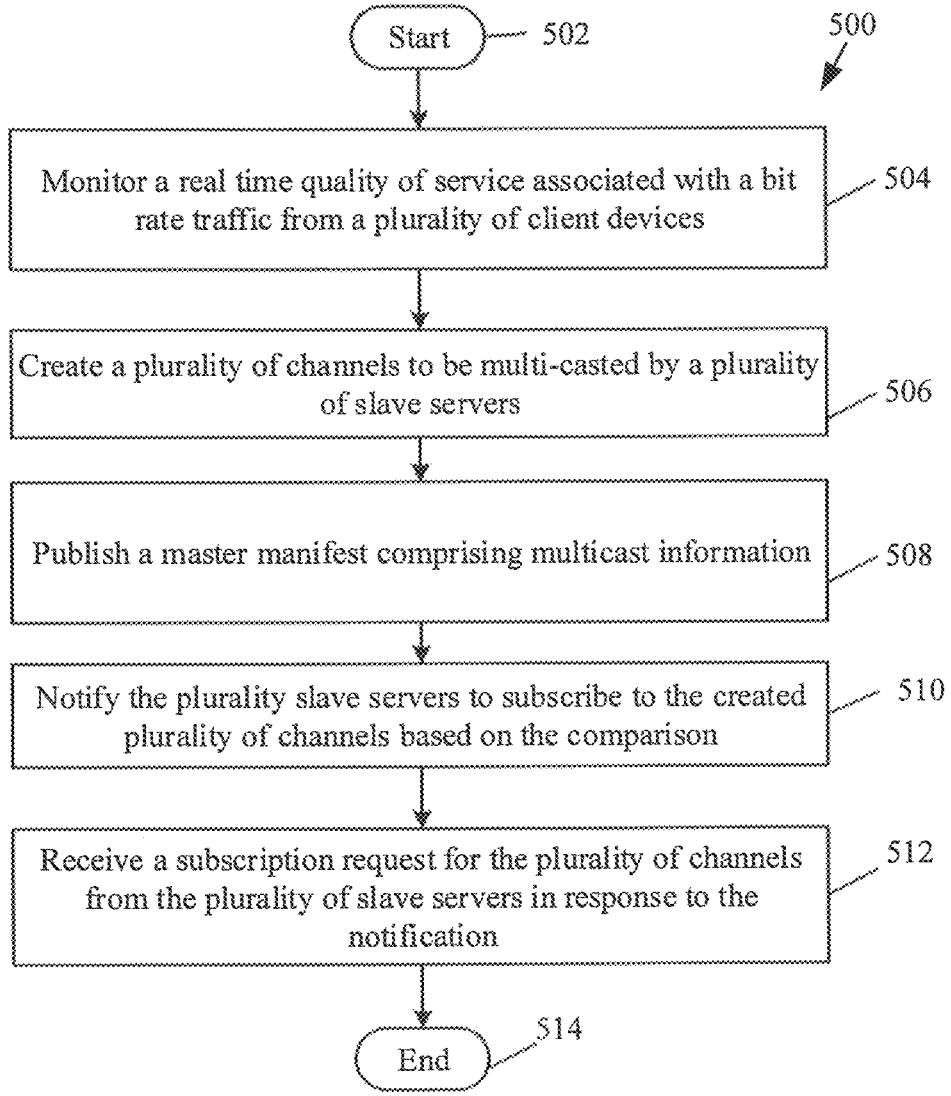
FIG. 5 is a flowchart illustrating a method for delivering multimedia content in a downstream network.

FIG. 5 is a flowchart illustrating a method 500 for delivering multimedia content in a downstream network. The method starts at step 502 and ends at step 514. At step 504 the content delivery system 104 may monitor a real-time quality of service associated with a bit rate traffic from a plurality of client devices 108. At step 506 the content delivery system 104 may create a plurality of channels 120 to be multi-casted by a plurality of slave servers 106. At step 508 the content delivery system 104 may publish a master manifest 204a comprising the multicast information. At step 510 the content delivery system 104 may notify the plurality of slave servers 106 to subscribe to the created plurality of channels 120 based on the comparison. At step 512 the content delivery system 104 may receive a subscription request for the plurality of channels 120 from the plurality of slave servers 106 in response to the notification. Control passes to step 514.

Figure 6:
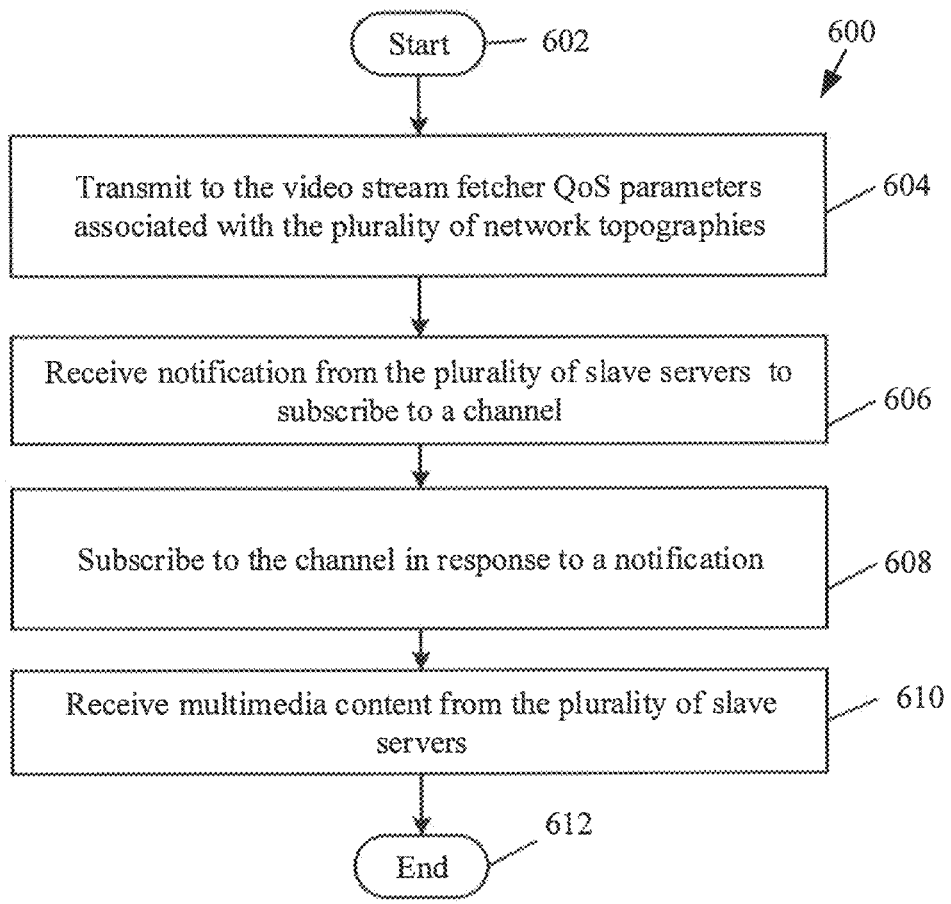
FIG. 6 is a flow chart illustrating the method for delivering multimedia content from the client devices' perspective.

FIG. 6 is a flowchart illustrating a method 600 for delivering multimedia content in a downstream network from a client perspective. The method starts at step 602. At step 604 the plurality of client devices 108 may transmit QoS (parameters) associated with the plurality of network topographies. At step 606 the plurality of client devices 108 may receive notification from the plurality of slave servers 106 to subscribe to a channel. At step 608 the plurality of client devices 108 subscribes to the channel in response to the notification. Step 610 involves receiving the multimedia content from the plurality of slave servers 106. The method ends at step 612.

Computer System

FIG. 7 illustrates a block diagram of an exemplary computer system for implementing embodiments consistent with the present disclosure. Variations of computer system 701 may be used for delivering multimedia content in a downstream network. The computer system 701 may comprise a central processing unit ("CPU" or "processor") 702. Processor 702 may comprise at least one data processor for executing program components for executing user or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD® ATHLON®, DURON® OR OPTERON®, ARM's application, embedded or secure processors, IBM PowerPC®, INTEL'S CORE®, ITANIUM®, XEON®, CELERON® or other line of processors, etc. The processor 702 may be implemented using mainframe, distributed processor, multi-core, parallel, grid, or other architectures. Some embodiments may utilize embedded technologies like application-specific, integrated circuits (ASICs), digital signal processors (DSPs), Field Programmable Gate Arrays (FPGAs), etc.

Using the I/O interface 703, the computer system 701 may communicate with one or more I/O devices. For example, the input device 704 may be an antenna, keyboard, mouse, joystick, (infrared) remote control, camera, card reader, fax machine, dangle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 705 may be a printer, fax machine, video display (e.g., cathode ray tube (CRT), liquid crystal display (LCD), light-emitting diode (LED), plasma, or the like), audio speaker, etc. In some embodiments, a transceiver may be disposed in connection with the processor 702. The transceiver may facilitate various types of wireless transmission or reception. For example, the transceiver may include an antenna operatively connected to a transceiver chip TEXAS INSTRUMENTS WILINK WL1283®, BROADCOM BCM4750IUB8® INFINEON TECHNOLOGIES X-GOLD 618-PMB9800® or the like), providing IEEE 802.11a/b/g/n, Bluetooth, FM, global positioning system (GPS), 2G/3G HSDPA/HSUPA communications, etc.

In some embodiments, the processor 702 may be disposed in communication with a communication network 708 via a network interface 707. The network interface 707 may communicate with the communication network 708. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 708 may include, without limitation, a direct interconnection, local area network (LAN), wide area network (WAN), wireless network (e.g., using Wireless Application Protocol), the Internet, etc. Using the network interface 707 and the communication network 708, the computer system 701 may communicate with devices 710, 711, and 712. These devices may include, without limitation, personal computer(s), server(s), fax machines, printers, scanners, various mobile devices such as cellular telephones, smartphones (e.g., APPLE® IPHONE®, BLACKBERRY®, Android-based phones, etc.), tablet computers, eBook readers (AMAZON® KINDLE®, NOOK®, etc.), laptop computers, notebooks, gaming consoles (MICROSOFT® XBOX®, NINTENDO DS®, SONY® PLAYSTATION®, etc.), or the like. In some embodiments, the computer system 701 may itself embody one or more of these devices.

In some embodiments, the processor 702 may be disposed in communication with one or more memory devices (e.g., RAM 713, ROM 714, etc.) via a storage interface 712. The storage interface may connect to memory devices including, without limitation, memory drives, removable disc drives, etc., employing connection protocols such as serial advanced technology attachment (SATA®), integrated drive electronics (IDE), IEEE-1394, universal serial bus (USB), fiber channel, small computer systems interface (SCSI®), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 716, user interface application 717, web browser 718, mail server 719, mail client 720, user/application data 721 (e.g., any data variables or data records discussed in this disclosure), etc. The operating system 716 may facilitate resource management and operation of the computer system 701. Examples of operating systems include, without limitation, APPLE® MACINTOSH OS X®, UNIX®, Unix-like system distributions (e.g., BERKELEY SOFTWARE DISTRIBUTION® (BSD), FreeBSD, NetBSD, OpenBSD, etc.), Linux distributions (e.g., RED HAT®, UBUNTU®, KUBUNTU®, etc.), IBM OS/2®, MICROSOFT® WINDOWS® (XP, Vista/7/8, etc.), APPLE iOS®, GOGGLE® ANDROID®, BLACKBERRY OS®, or the like. User interface application 717 may facilitate display, execution, interaction, manipulation, or operation of program components through textual or graphical facilities. For example, user interfaces may provide computer interaction interface elements on a display system operatively connected to the computer system 701, such as cursors, icons, check boxes, menus, scrollers, windows, widgets, etc. Graphical user interfaces (GUIs) may be employed, including, without limitation, APPLE MACINTOSH® operating systems' Aqua, IBM® OS/2, MICROSOFT WINDOWS® (e.g., Aero, Metro, etc.), UNIX X-WINDOWS®, web interface libraries (e.g., ActiveX®, Java®, JavaScript®, AJAX®, HTML, ADOBE FLASH®, etc.), or the like.

In some embodiments, the computer system 701 may implement a web browser 718 stored program component. The web browser may be a hypertext viewing application, such MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc, Web browsers may utilize facilities such as AJAX®, DHTML®, ADOBE® FLASH®, JAVASCRIPT®, JAVA®, application programming interfaces (APIs), etc. In some embodiments, the computer system 701 may implement a mail server 719 stored program component. The mail server may be an Internet mail server such as MICROSOFT® EXCHANGE®, or the like. The mail server may utilize facilities such as ASP, ACTIVEX®, ANSI C++/C#, MICROSOFT® .NET®, CGI scripts, JAVA®, JAVASCRIPT®, PER®, PHP®, Python™, WebObjects, etc. The mail server may utilize communication protocols such as internet message access protocol (IMAP), messaging application programming interface (MAPI), MICROSOFT EXCHANGE®, post office protocol (POP), simple mail transfer protocol (SMTP), or the like. In some embodiments, the computer system 701 may implement a mail client 720 stored program component. The mail client may be a mail viewing application, such as APPLE MAIL®, MICROSOFT ENTOURAGE®, MICROSOFT OUTLOOK®, MOZILLA THUNDERBIRD®, etc.

In some embodiments, computer system 701 may store user/application data 721, such as the data, variables, records, etc. as described in this disclosure. Such databases may be implemented as fault-tolerant, relational, scalable, secure databases such as ORACLE® OR SYBASE®. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The content delivery system 104 delivers multimedia content in a downstream network. Further, the content delivery system 104 provides a solution to distribute live and on-demand video through active subscription to multicast ring networks on the core-aggregate & network access layer based on not only user consumption and state of network traffic but also factors in video QoS experience of users. The disclosed system makes multicast delivery of ABR profiles to be made available as closer to the user as possible, by polling the network conditions and user activities, and making the network components programmable to ensure the delivery. The disclosed system distributes live and on-demand video through active subscription to multicast networks on the core-aggregate & network access layer based on not only user consumption and state of network traffic but also factors in video QoS experience of users. The disclosed system leverage existing CDN networks to deliver ABR video profiles to the edge and use multicast to stream video on the core-aggregate-access network based on active network conditions and state of traffic at that point in time monitored through SDN controllers. The disclosed system create/update existing multicast network rings to optimally route traffic ensuring better video QoS for subscribers. It also dynamically adapts to prevailing network conditions and active decision making to construct optimal end-to-end multicast traffic throughput.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise. The terms "including", "comprising", "having" and variations thereof mean "including but not limited to", unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the disclosure.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the embodiments of the present disclosure are intended to be illustrative, but not limiting, of the scope of the disclosure, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

We claim:

1. A method for delivering multimedia content in a downstream network, the method comprising:
    monitoring, by a content delivery system, a real-time quality of service associated with a bit rate traffic from a plurality of client devices, wherein the quality of service associated with the bit rate traffic are associated with a plurality of network topographies, wherein the real time quality of service associated with the plurality of network topographies is determined based on network latencies, packets per second, active versus inactive multicast routing nodes, failed nodes, video throughput, video frame losses, load on the plurality of slave servers, number of active versus available slave servers, popular titles and channels being watched, number of concurrent and active subscribed client devices on the plurality of channels being multi-casted by the plurality of slave servers;
    creating, by the content delivery system, a plurality of channels, to be multi-casted by a plurality of slave servers, associated with a plurality of adaptive bit rates associated with the multimedia content based on the monitoring, wherein the plurality of channels has an associated identifier;
    publishing, by the content delivery system, a master manifest comprising multicast information associated with each of the plurality of channels;
    comparing, by the content delivery system, the master manifest with the bit rate traffic from the plurality of client devices;
    notifying, by the content delivery system, the plurality of slave servers to subscribe to the created plurality of channels based on the comparison;
    receiving, by the content delivery system, a subscription request for the plurality of channels from the plurality of slave servers in response to the notification,
        wherein the plurality of slave servers subscribe to the multimedia content by configuring multicast transmission of Precision Time Protocol (PTP) packets between the plurality of slave servers and the multimedia content, and
        wherein the multimedia content subscribed by the plurality of slave servers in response to the received subscription request is multi-casted to the plurality of client devices based on the subscription associated with each of the plurality of client devices;
    updating, by the content delivery system, the plurality of adaptive bit rates into one or more updated adaptive bit rates, wherein the plurality of channels associated with the updated adaptive bit rates are associated with new server identifiers, in case of degradation of the quality of service associated with the multimedia content; and
    deleting, by the content delivery system, the plurality of channels based on a notification from the plurality of slave servers, wherein the plurality of channels are deleted when a subscription request for the multimedia content from the plurality of client devices decreases quantitatively to a pre-determined value.

2. The method of claim 1, further comprising monitoring re-buffering ratio, average bit rate, concurrent streams played, and buffer rates of the multimedia content multi-casted to the plurality of client devices.

3. The method of claim 1, further comprising traversing by the multicast information through the plurality of channels associated with the identifiers, to the plurality of slave servers.

4. The method of claim 1, further comprising deletion of the plurality of channels based on a notification from one or more slave servers, wherein the one or more slave servers transmit the notification to the content delivery system, wherein the subscription request for the multimedia content from the plurality of client devices decreases quantitatively to a pre-determined value.

5. A content delivery system to deliver multimedia content in a downstream network, comprising:
 a processor; and
 a memory communicatively coupled to the processor, wherein the memory stores processor instructions, which, on execution, causes the processor to:
 monitor, by a content delivery system, a real-time quality of service associated with a bit rate traffic from a plurality of client devices, wherein the quality of service associated with the bit rate traffic are associated with a plurality of network topographies, wherein the real time quality of service associated with the plurality of network topographies is determined based on network latencies, packets per second, active versus inactive multicast routing nodes, failed nodes, video throughout, video frame losses, load on the plurality of slave servers, number of active versus available slave servers, popular titles and channels being watched, number of concurrent and active subscribed client devices on the plurality of channels being multi-casted by the plurality of slave servers;
 create a plurality of channels to be multi-casted by a plurality of slave servers, associated with a plurality of adaptive bit rates associated with a multimedia content based on the monitoring, wherein the plurality of channels has an associated identifier;
 publish a master manifest comprising multicast information associated with each of the plurality of channels;
 compare the master manifest with the bit rate traffic from the plurality of client devices;
 notify the plurality of slave servers to subscribe to the created plurality of channels based on the comparison; and
 receive a subscription request for the plurality of channels from the plurality of slave servers in response, to the notification,
  wherein the plurality of slave servers subscribe to the multimedia content by configuring multicast transmission of Precision Time Protocol (PTP) packets between the plurality of slave servers and the multimedia content, and
  wherein the multimedia content subscribed by the plurality of slave servers in response to the received subscription request is multi-casted to the plurality of client devices based on the subscription associated with each of the plurality of client devices;
 update the plurality of adaptive bit rates into one or more updated adaptive bit rates, wherein the plurality of channels associated with the updated adaptive bit rates are associated with new server identifiers, in case of degradation of the quality of service associated with the multimedia content; and
 delete the plurality of channels based on a notification from the plurality of slave servers, wherein the plurality of channels are deleted when a subscription request for the multimedia content from the plurality of client devices decreases quantitatively to a pre-determined value.

6. The content delivery system of claim 5, wherein the processor is further configured to monitor re-buffering ratio, average bit rate, concurrent streams played, and buffer rates of the multimedia content multi-casted to the plurality of client devices.

7. The content delivery system of claim 5 wherein the processor is configured to traverse by the multicast information through the plurality of channels associated with the identifiers, to the plurality of slave servers.

8. The content delivery system of claim 5 wherein the processor is configured to delete the plurality of channels based on a notification from one or more slave servers, wherein the ore or more slave servers transmit the notification to the content delivery system, wherein the subscription request for the multimedia content from the plurality of client devices decreases quantitatively to a pre-determined value.

9. A non-transitory computer-readable storage medium having stored thereon, a set of computer-executable instructions for causing a computer comprising one or more processors to perform steps comprising:
 monitoring a real-time quality of service associated with a bit rate traffic from a plurality of client devices, wherein the quality of service associated with the bit rate traffic are associated with a plurality of network topographies, wherein the real time quality of service associated with the plurality of network topographies is determined based on network latencies, packets per second, active versus inactive multicast routing nodes, failed nodes, video throughout, video frame losses, load on the plurality of slave servers, number of active versus available slave servers, popular titles and channels being watched, number of concurrent and active subscribed client devices on the plurality of channels being multi-casted by the plurality of slave servers;
 creating a plurality of channels, to be multi-casted by a plurality of slave servers, associated with a plurality of adaptive bit rates associated with a multimedia content based on the monitoring, wherein the plurality of channels has an associated identifier;
 publishing a master manifest comprising multicast information associated with each of the plurality of channels;
 comparing the master manifest with the bit rate traffic from the plurality of client devices;
 notifying the plurality of slave servers to subscribe to the created plurality of channels based on the comparison; and
 receiving a subscription request for the plurality of channels from the plurality of slave servers in response to the notification,
  wherein the plurality of slave servers subscribe to the multimedia content by configuring multicast transmission of Precision Time Protocol (PTP) packets between the plurality of slave servers and the multimedia content, and
  wherein the multimedia content subscribed by the plurality of slave servers in response to the received subscription request is multi-casted to the plurality of client devices based on the subscription associated with each of the plurality of client devices;

updating the plurality of adaptive bit rates into one or more updated adaptive bit rates, wherein the plurality of channels associated with the updated adaptive bit rates are associated with new server identifiers, in case of degradation of the quality of service associated with the multimedia content; and deleting the plurality of channels based on a notification from the plurality of slave servers, wherein the plurality of channels are deleted when a subscription request for the multimedia content from the plurality of client devices decreases quantitatively to a pre-determined value.

* * * * *